(No Model.) 2 Sheets—Sheet 1.

H. PFÜTZNER.
RENDERING APPARATUS.

No. 543,350. Patented July 23, 1895.

Witnesses:
Wm. Schulz
H. Jonghmans

Inventor:
H. Pfützner
per Roeder & Briesen
attys.

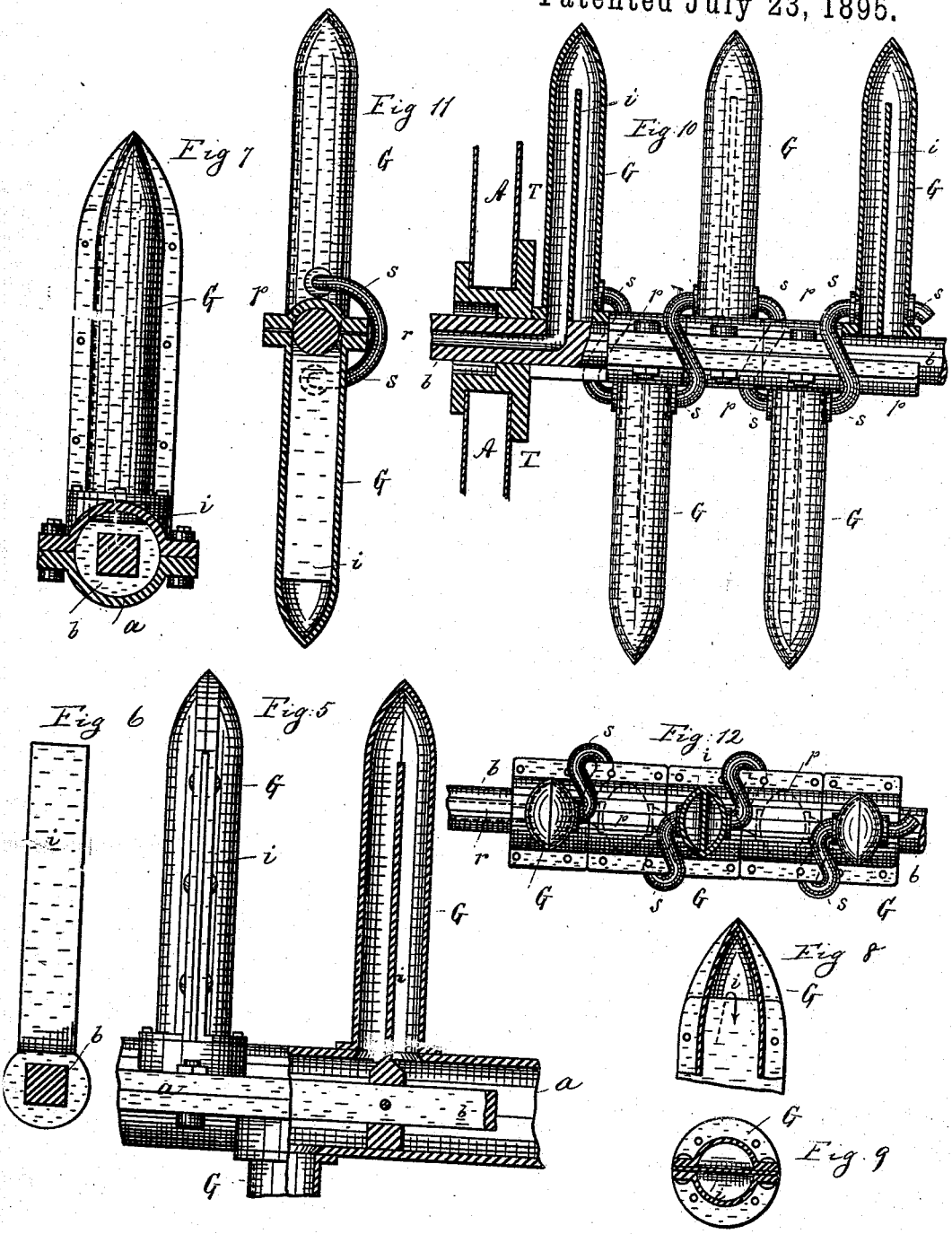

UNITED-STATES PATENT OFFICE.

HERMANN PFÜTZNER, OF LEIPSIC, GERMANY.

RENDERING APPARATUS.

SPECIFICATION forming part of Letters Patent No. 543,350, dated July 23, 1895.

Application filed March 9, 1892. Serial No. 424,299. (No model.) Patented in Germany July 19, 1891, No. 63,537; in Austria-Hungary August 3, 1891, No. 87,204 and No. 61,906; in England August 4, 1891, No. 13,189; in France August 10, 1891, No. 215,426, and in Belgium October 10, 1891, No. 96,743.

*To all whom it may concern:*

Be it known that I, HERMANN PFÜTZNER, of Leipsic, in the Kingdom of Saxony, Germany, have invented a new and useful Improvement in Rendering Apparatus, (for which I have obtained the following patents: in Germany, No. 63,537, dated July 19, 1891; in Austria-Hungary, No. 87,204 and No. 61,906, dated August 3, 1891; in England, No. 13,189, dated August 4, 1891; in France, No. 215,426, dated August 10, 1891, and in Belgium, No. 96,743, dated October 10, 1891,) of which the following is a specification.

This invention relates to a rendering apparatus for melting fats and other easily-fusible substances, or for boiling and stirring the same.

It consists in the various features of improvements described, and fully pointed out in the claim.

Figure 1:
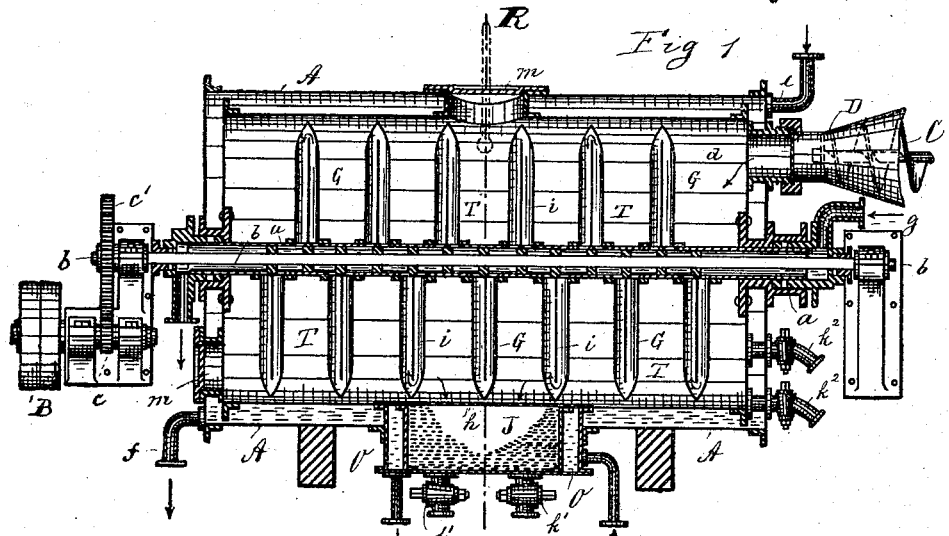
Figure 4:
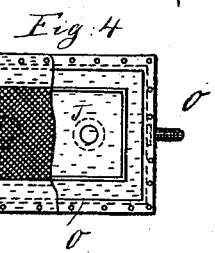
Figure 2:
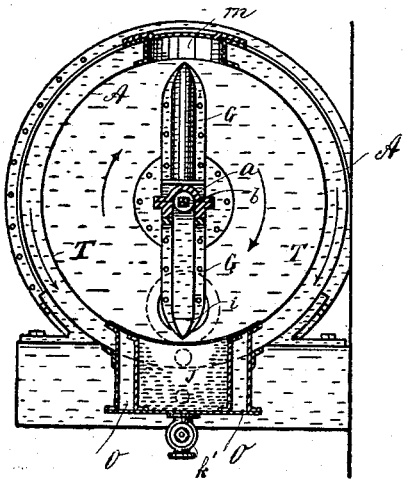
Figure 3:
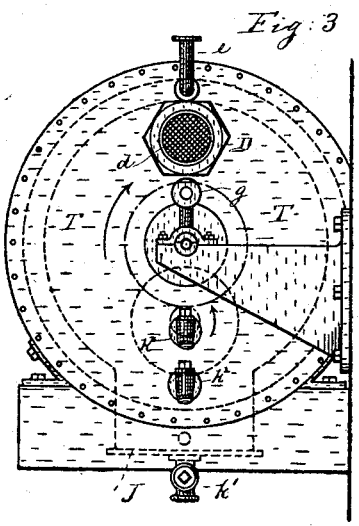

In the accompanying drawings, Figure 1 is a longitudinal section through the apparatus; Fig. 2, a cross-section on line R R, Fig. 1; Fig. 3, an end view thereof; Fig. 4, a top view of the accumulator J; Fig. 5, a detail elevation, partly in section, of fingers G. Fig. 6 is a side elevation of partition $i$, with shaft $b$, in section; Fig. 7, an elevation of a finger with the tube $a$ in cross-section; Fig. 8, a vertical section through the tip of the finger; Fig. 9, a cross-section through the finger; Fig. 10, an elevation, partly in section, of a modification; Fig. 11, a vertical section at right angles to Fig. 10; and Fig. 12, a top view, partly in section, of Fig. 10.

The letter T represents a fixed drum provided with a surrounding jacket A and with a central tubular shaft $a$. The shaft $a$ is revolved by pulley B, which acts through gear-wheels $c$ $c'$ upon a shaft $b$, extending through and connected with shaft $a$.

D is the hopper for admitting the fat or other matter to the drum. The hopper is provided with a conveyer C for causing a continuous feed, and also with a strainer $d$. The fat is thus pressed through the strainer and enters the drum T.

The heating medium, such as hot water, enters the jacket at $e$ and is discharged therefrom at $f$. An additional heating medium enters the shaft $a$ at $g$ and passes through the shaft and through a set of hollow stirring-fingers G connected thereto. Each finger is provided with an upright partition $i$, around which the heating medium must pass on its way through the apparatus.

The fingers G revolve slowly with their shaft to act upon the fatty or other contents of the drum. These contents, being subjected to the action of the heat, will melt slowly. The resultant tallow or other product is passed through strainer $h$ into an accumulator J, having draw-off cocks $k'$ $k'$. From these cocks the tallow may be drawn into the clarifiers. The accumulator J is provided with a jacket $o$ to keep the contents of the drum at the proper temperature and degree of liquidity.

$m$ $m$ are manholes through which the apparatus may be cleaned and emptied, and $k^2$ $k^2$ are cocks to be used in case the strainer becomes clogged.

In Figs. 10 and 12 the hollow shaft $a$ is dispensed with and the fingers G are attached directly to the shaft $b$ by collars $p$. The fingers G are connected by short spiral tubes $s$. The heating medium enters the first finger through a bore $r$ of shaft $b$. It then passes through fingers G and tubes $s$, to be discharged from the last finger by a similar bore.

The apparatus works continuously and produces a uniform product, as overheating is prevented on account of the material being subjected to the action of fixed and movable heating-surfaces.

What I claim is—

In a rendering tank, the combination of a horizontal jacketed drum with an inlet hopper provided with a screen and conveyer, a revolving shaft passing through the center of the drum, a series of hollow communicating and partitioned fingers secured thereto in such manner that the heating agent passes in succession through the same, a jacketed accumulator located at the bottom of the drum and a screen above such accumulator, substantially as specified.

In testimony whereof I have signed my name to this specification in the presence of two subscribing witnesses.

HERMANN PFÜTZNER.

Witnesses:
MAX MATTHÄI,
CARL BORNGRAEBER.